(12) United States Patent
Beaufort

(10) Patent No.: US 7,147,185 B2
(45) Date of Patent: Dec. 12, 2006

(54) DEVICE FOR ASSEMBLY OF A SHROUD PLACED BETWEEN AN AIRCRAFT ENGINE AIR INTAKE AND A PYLON

(75) Inventor: Jacques Beaufort, Blagnac (FR)

(73) Assignee: Airbus France, Toulouse (FR)

( * ) Notice: Subject to any disclaimer, the term of this patent is extended or adjusted under 35 U.S.C. 154(b) by 202 days.

(21) Appl. No.: 10/954,192

(22) Filed: Oct. 1, 2004

(65) Prior Publication Data
US 2006/0060697 A1   Mar. 23, 2006

(30) Foreign Application Priority Data
Oct. 22, 2003   (FR) .................................. 03 50715

(51) Int. Cl.
*B64D 27/00* (2006.01)
(52) U.S. Cl. .................................. 244/53 B
(58) Field of Classification Search ............... 244/54, 244/53 B; 60/796; 298/554, 557
See application file for complete search history.

(56) References Cited

U.S. PATENT DOCUMENTS 3,347,578 A * 10/1967 Sheehan et al. ............ 292/113
4,037,809 A *  7/1977 Legrand ....................... 244/54
4,474,346 A * 10/1984 Murphy et al. .............. 244/54
4,555,078 A * 11/1985 Grognard ..................... 244/54

FOREIGN PATENT DOCUMENTS

GB         499 846        1/1939

* cited by examiner

*Primary Examiner*—Tien Dinh
(74) *Attorney, Agent, or Firm*—Oblon, Spivak, McClelland, Maier & Neustadt, P.C.

(57) ABSTRACT

The invention relates to a device (131) for assembly of a shroud (26) arranged between an air intake (22) and a pylon (2) fixed to the engine (4), the device comprising:
stressed flexible means (130) provided with a first end (130a) and a second end (130b);
first connection means connected to the air intake and to the end (130a); and
second connection means connected to the shroud and to the end (130b).

According to the invention, the second connection means comprise a primary assembly (140) fixed to the shroud and a secondary assembly (142) fixed to the second end (130b), and the primary and secondary assemblies (140,142) are connected to each other through a pivot connection (144).

11 Claims, 5 Drawing Sheets

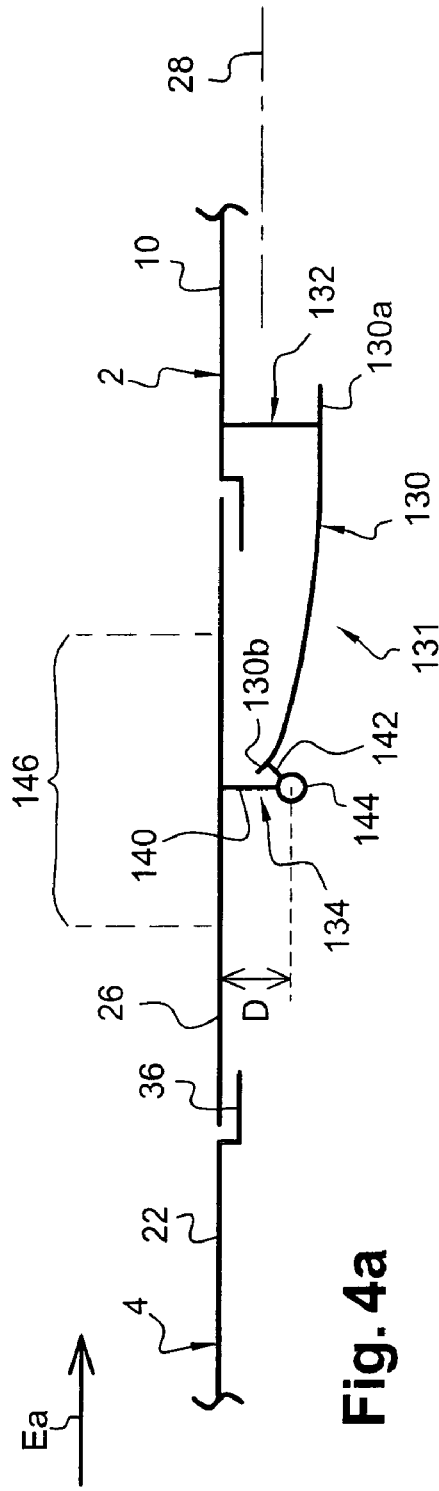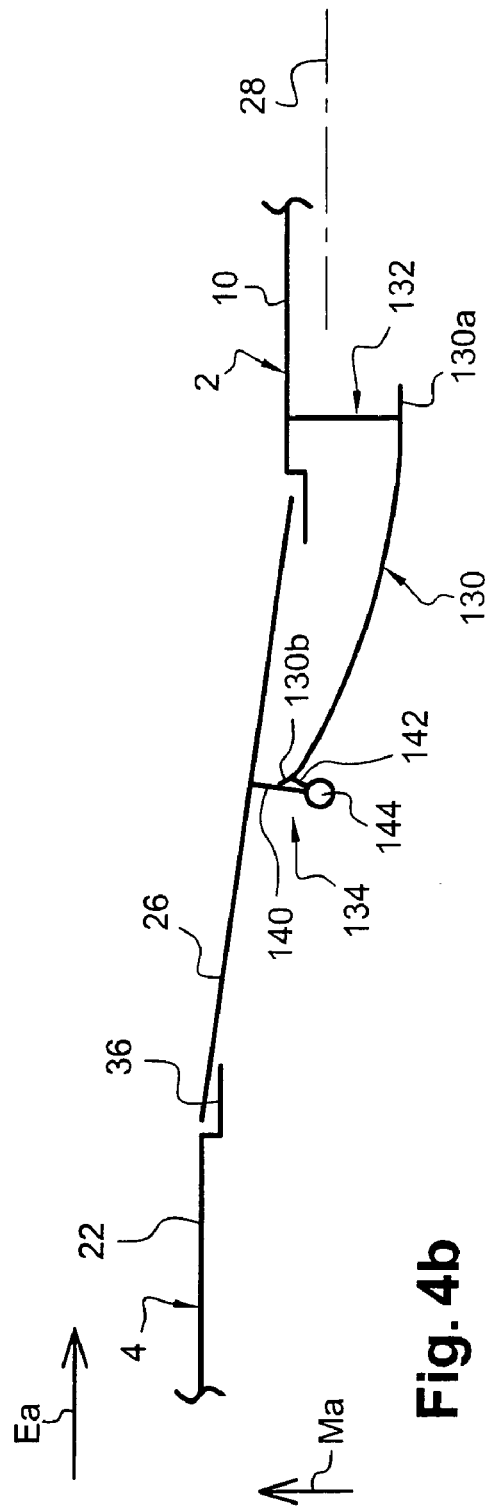

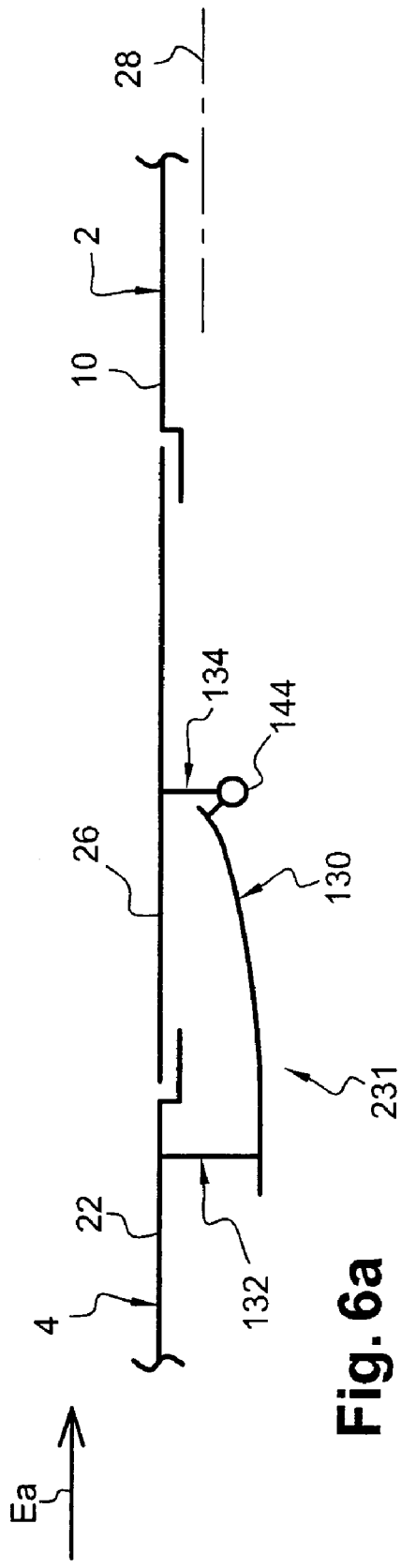
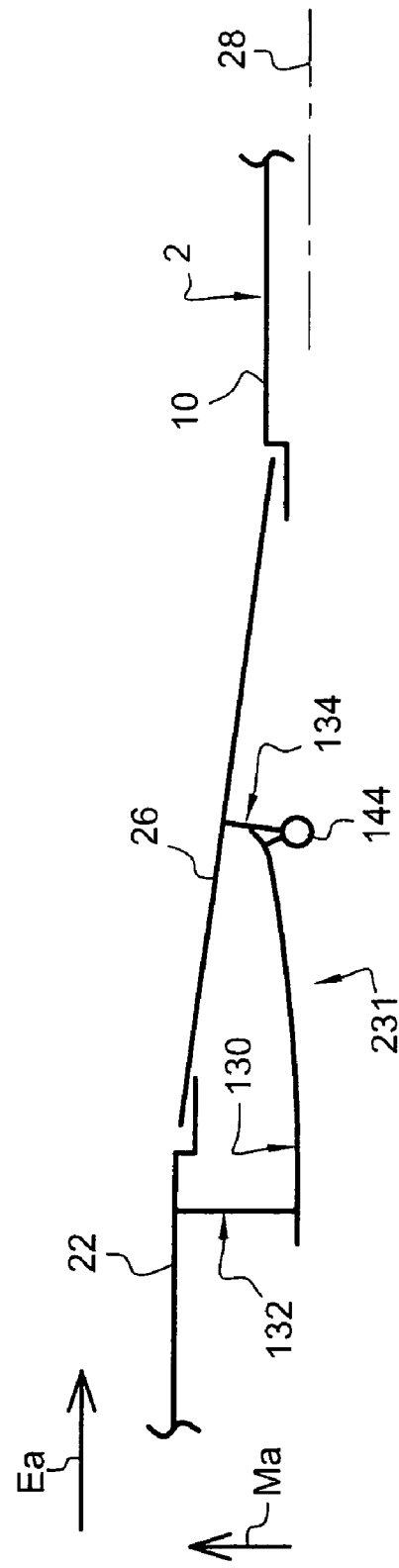

DEVICE FOR ASSEMBLY OF A SHROUD PLACED BETWEEN AN AIRCRAFT ENGINE AIR INTAKE AND A PYLON

TECHNICAL DOMAIN

This invention relates in general to an aircraft comprising at least one engine with an air intake, each engine being fixed to a pylon itself fixed to a structure element of this aircraft, a shroud being installed between the engine air intake and the pylon. In this respect, note that the shroud, also called the visor, has an adapted shape so that it can be integrated to match the aerodynamic shapes of the pylon and the air intake of the engine, and is conventionally designed to reduce the misalignment that occurs between this air intake and the pylon of the engine concerned.

The invention also relates to a device for assembly of such a shroud/fairing.

STATE OF PRIOR ART

In a known manner and with reference to FIG. 1 showing an assembly 1 for an aircraft provided with a pylon 2 from which an engine 4 is suspended, the pylon 2 of an aircraft 4 forms a connection between this same engine 4 and a structure element of this aircraft, such as its wing or fuselage (not shown). Note that the pylon 2 shown in this FIG. 1 is designed such that it can be fixed under one of the wings of the aircraft.

The pylon 2 is actually capable of transmitting forces generated by the engine to the aircraft structure, and also enables passage of fuel, electricity, hydraulics and air between the engine 4 and the structure of the aircraft.

Furthermore, the pylon 2 is usually designed so as to respect different constraints such as the need for maximum safety, or to obtain an induced aerodynamic drag, with the lowest possible mass and cost.

In order to transmit forces generated by the engine 4, the pylon 2 comprises a main and central structure 6 usually provided with a frame, for example in the form of a box. As an illustrative example, this frame may comprise ribs and panels, and fasteners through which the pylon 2 is fixed firstly to the engine 4, and secondly to the aircraft structure. A fastener 8 of the pylon 2 that contributes to supporting the engine 4 is shown in FIG. 1. As can be seen clearly in this Figure, the fastener 8 is anchored to a central casing 16 of the engine 4, to transmit forces generated by the engine 4 as efficiently as possible. In other words, the pylon 2 penetrates inside the secondary annular flow channel 18 formed between the central casing 16 and the nacelle 20 surrounding it.

Classically, the pylon 2 also comprises a forward secondary structure 10 and an aft secondary structure 12, the terms "forward" and "aft" here and in the remainder of the description referring to the air flow direction through the engine 4, as shown by the arrow reference Ea in FIG. 1.

Furthermore, in order to reduce the aerodynamic drag generated by this pylon 2 and more particularly by its trailing edge, it is provided with a rear shroud 14 connected to the back of the rear secondary structure 12, and designed to form an aerodynamic extension 15 of the extrados of the wing to which this pylon is fixed.

Still in a known manner, the engines (particularly large engines) are subject to large deflections and deformations. These deflections and deformations are caused partly by reaction forces applied to engine fasteners as a result of engine thrust, and secondly external moments applied by aerodynamic pressures on an air intake 22 of the engine 4. The main deflections observed during operation of the engine 4 are generated by a bending moment that is associated with a high thrust. Note that this high thrust is the sum of internal forces, and the resulting internal force acts along a longitudinal main axis 24 of the engine 4. Thus, the fasteners of the engine 4 react to this thrust and transmit a reaction force to the aircraft structure. Nevertheless, note that this reaction force acts above the axis 24 causing the above mentioned bending moment, as a result of various assembly constraints, such as the constraint of fixing the fastener 8 on the central casing 16 of the engine 4.

As mentioned above, a shroud 26 is placed between the engine 4 and the pylon 2, and more particularly between the air intake 22 and the forward secondary structure 10. The shroud or the visor 26 has an adapted shape so that it can be integrated to match the aerodynamic shapes of the forward secondary structure 10 and the air intake 22, and is conventionally designed to reduce the misalignment that occurs between these two elements, this misalignment being accentuated under the effect of the bending moment when aircraft thrust is applied.

Still with reference to FIG. 1, the figure shows the shroud 26, also called the "aerodynamically integrated shroud", with a fairly complex shape in that it has a convex central part 26a designed for aerodynamic continuity with the forward secondary structure 10 of the pylon 2. However, note that the shroud 26 may be in a simpler form such as a rectangle with a slight curvature so that it matches the air intake 22 correctly, this shroud consequently being like a simple annular sector. Furthermore, conventionally, a curved length L of this annular sector is located in a plane (not shown) approximately orthogonal to a longitudinal principal direction 28 of the pylon 2 that is a approximately parallel to the main longitudinal axis 24 of the engine 4, and for which the straight width 1 is approximately parallel to this longitudinal principal direction 28.

FIG. 2a partially and diagrammatically shows the assembly 1 in FIG. 1, and a principle diagram of an assembly device 31 of the shroud 26 according to a conventional embodiment of prior art, when the engine 4 is not subject to the bending moment mentioned above.

This figure shows that the rear part of the shroud 26 is connected to the forward secondary structure 10 of the pylon 2, particularly through flexible means 30 in the form of a leaf spring or a coil spring extending approximately parallel to the longitudinal principal direction 28 of the pylon 2. These flexible means 30, forming an integral part of the assembly device 31 of the shroud 26, comprise a first end 30a fixed to first connection means 32 themselves fixed to the forward secondary structure 10 and to a second end 30b fixed to second connection means 34 themselves fixed to the shroud 26.

Moreover, the forward part of the shroud 26 is bearing along a portion 36 of the air intake 22, this portion 36 projecting backwards and having a slight downwards offset to enable perfect aerodynamic continuity between the two elements 22 and 26. Note that this freedom of movement between these two elements 22 and 26 is designed so that the shroud 26 can follow the displacements of the air intake 22, and more specifically its upwards movement generated by the bending moment mentioned above under a high thrust, as will be described more clearly below. Moreover, when the engine 4 is not subjected to the bending moment mentioned above, the rear part of the shroud 26 bears in contact with the forward secondary structure 10 of the pylon 2.

With this arrangement, the return force generated by the flexible means 30 installed so that they are stressed even when the engine 4 is not subjected to the bending moment, forces the shroud 26 into contact with the air intake 22 and the pylon 2. Consequently, the result is a permanent realignment between the pylon 2 and this same air intake 22, mainly due to the contact between the shroud 26 and the air intake 22.

With reference to FIG. 2b, approximately the same as FIG. 2a except that in this case the engine 4 is subjected to the bending moment mentioned above, it can be seen that when the air intake 22 is controlled by its upwards movement shown diagrammatically by the arrow Ma, the shroud 26 is capable of following this movement due to deformation of the flexible means 30 of the device 31, that then generate a return force even greater than the return force caused when the engine 4 is not subjected to the bending moment.

Nevertheless, it can be seen in this figure 2b that the shroud/fairing 26 not only performs a rotation movement bringing the forward part of this shroud 26 to the same height at its aft part, but also performs a upwards translation movement such that the rear part of the shroud 26 is no longer flush with the forward secondary structure 10 of the pylon 2, thus creating a gap 38 and an aerodynamic discontinuity between the two elements 26 and 10.

Furthermore, the positive/negative pressure forces generated by the aerodynamic flow will tend to lift the forward free part of the shroud 26. Thus, this "scooping" phenomenon directly results in the creation of an induced aerodynamic drag that is highly undesirable.

Naturally, an increase in the stiffness of the flexible means 30 would reduce this phenomenon, but at the same time would increase the intensity of the contact between the forward part of the shroud 26 and the portion 36 of the air intake 22, which would then cause accelerated wear of the bearing area between the two elements 26 and 36.

Note also if the stiffness of the flexible means 30 is increased too much, rotation of the shroud 26 may be prevented although this rotation is essential for following the upwards movement of the engine 4, and is therefore of paramount importance for realigning the air intake 22 and the shroud 26.

Thus, it is clear that the architecture proposed at the moment and described above can induce an aerodynamic drag in some flight phases that reduces the global performance of the aircraft.

OBJECT OF THE INVENTION

Therefore, the purpose of the invention is to propose a device for installing a shroud arranged between firstly an air intake of an aircraft engine and secondly a pylon fixed to the said engine end to an element of this aircraft structure, this assembly device being designed to at least partially overcome the disadvantages mentioned above related to embodiments of prior art.

Furthermore, another purpose of the invention is to present an aircraft with at least one assembly device like that satisfying the purpose mentioned above.

To achieve this, the object of the invention is a device for assembly of a shroud arranged between firstly an air intake of an aircraft engine and secondly a pylon fixed to the engine and to a structure element of this aircraft, the device comprising:

stressed flexible means provided with a first end and a second end, these flexible means being designed to force the shroud into contact with the air intake and the engine pylon;

first connection means connected firstly to one of the elements among the group composed of the pylon and the air intake, and secondly to the first end of the flexible means, these first connection means being designed such that the first end of the flexible means is fixed to said one of the elements among the group composed of the pylon and the air intake; and second connection means connected firstly to the shroud and secondly to the second end of the flexible means.

According to the invention, the second connection means comprise a primary assembly fixed to the shroud and a secondary assembly fixed to the second end of the flexible means, and the primary and secondary assemblies are connected to each other through a pivot connection.

Advantageously, with such a configuration, the assembly device according to the invention enables the shroud to pivot around the pivot connection when the shroud follows the upwards movement of the air intake caused by the bending moment generated under the high thrust of the associated engine.

In this way, the ability of the shroud to pivot freely enables it to remain in contact firstly with the air intake during an upwards movement of this shroud, but also with the pylon, and particularly with its forward secondary structure.

During an upwards movement of the air intake that simultaneously causes deformation of the flexible means and pivoting of the shroud around the pivot connection of the assembly device, the shroud behaves approximately as it would if there were a simple pivot connection between the rear part of the shroud and the forward secondary structure of the pylon. Thus, in this case the combination between the rotation movement and the translation movement encountered with the assembly device according to prior art described above is substantially transformed into a single rotation movement that does not stop the rear part of the shroud from being flush with the forward secondary structure of the pylon.

This special feature then makes it possible to maintain aerodynamic continuity between the air intake and the pylon, regardless of their relative positions. Consequently, this also participates in significantly reducing the aerodynamic drag induced by the assembly composed of this shroud and the associated pylon and engine.

According to one preferred embodiment of this invention, the first connection means are connected to the pylon. With this arrangement, it is then possible for the pivot connection to be located close to a median portion of the shroud, considered along a longitudinal principal direction of the pylon.

To achieve this, the primary assembly of the second connection means is composed of a single primary part fixed to the median portion of the shroud considered along the longitudinal principal direction of the said pylon, and the secondary assembly of these second connection means is composed of a single secondary part connected to the primary part through the pivot connection.

Furthermore, the pivot connection is preferably made through a pivot axis about which each of the said primary and secondary parts can pivot.

Moreover, and still in this preferred embodiment of the invention, the first connection means comprise a base that keeps the first end of the flexible means fixed, this base being fixed to a forward end of the pylon. Furthermore, the first connection means can also include means of applying stress to flexible means, these means of applying stress cooperating with the base.

According to another preferred embodiment of this invention, the first connection means are connected to the air intake.

Advantageously, this preferred embodiment provides a means of completely eliminating the risk of scooping, namely lifting of the forward part of the shroud, to the extent that the aerodynamic flow tends to hold the shroud in contact simultaneously with the forward secondary structure of the pylon and the air intake of the engine.

Finally, for the two embodiments presented above, it is possible that the flexible means are composed of a flexible strip extending approximately parallel to a longitudinal principal direction of the pylon, or several superposed flexible strips extending approximately parallel to this same principal longitudinal direction of the pylon.

Another purpose of the invention is an aircraft comprising at least one engine with an air intake, each engine being fixed to a pylon itself fixed to a structure element of this aircraft, a shroud being installed between the engine air intake and the pylon. According to the invention, the shroud for each engine is installed between the air intake of the engine and the pylon through at least one assembly device like that described above, and also the purpose of this invention.

Other advantages and characteristics of the invention will become clearer in the non-limitative detailed description given below.

BRIEF DESCRIPTION OF THE DRAWINGS

This description will be made with reference to the appended drawings, wherein;

FIG. 4a shows a diagrammatic principle view of an assembly device in FIG. 3, when the engine is not subjected to the bending moment generated by the engine thrust;

FIG. 4b shows a principle diagrammatic view similar to that shown in FIG. 4a when the engine is subjected to the bending moment generated by the engine thrust;

FIG. 6a shows a principle diagrammatic view of an assembly device according to another preferred embodiment of this invention, when the engine is not subjected to the bending moment generated by the engine thrust; and FIG. 6b shows a diagrammatic principle view similar to that shown in FIG. 6a, when the engine is subjected to the bending moment generated by the engine thrust.

DETAILED DESCRIPTION OF PREFERRED EMBODIMENTS

Figure 1:
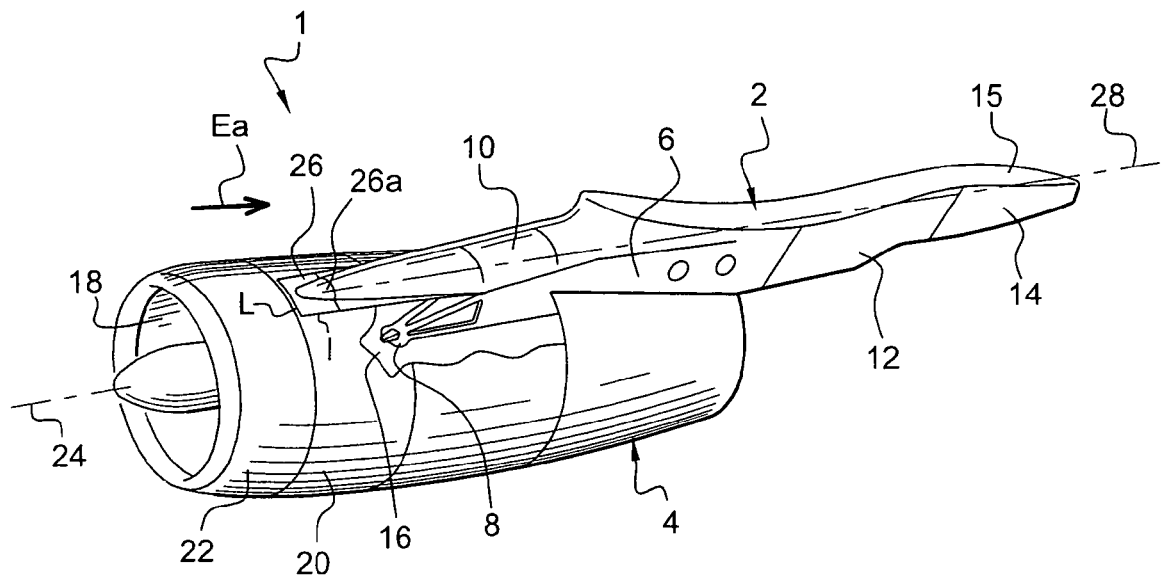
FIG. 1, already described, shows an assembly according to prior art for an aircraft, this assembly being provided with a pylon from which an engine is suspended.

The invention relates firstly to an aircraft (not shown), comprising at least one assembly 1 similar to that described in prior art and represented in FIG. 1, and preferably comprising one or two of these assemblies 1 under each of its two wings. In this respect, note that elements marked with the same numerical references in FIGS. 1 to 6b correspond to identical or similar elements.

In the invention, the assembly 1 is no longer provided with one or several devices 31 for assembly of the shroud 26, but rather with one or several assembly devices 131 that will be described in detail below, and that are also the purpose of this invention.

Figure 3:
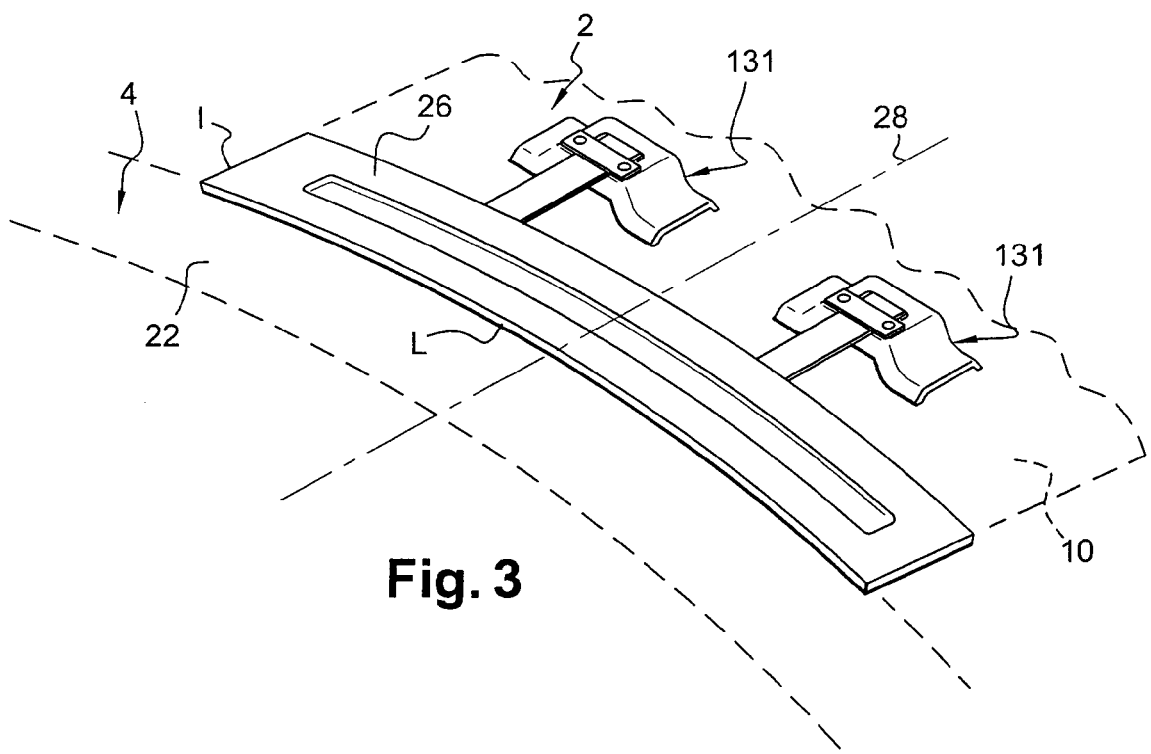
FIG. 3 shows a perspective view of two assembly devices, both according to a preferred embodiment of this invention in association with a shroud.
Figure 2A:
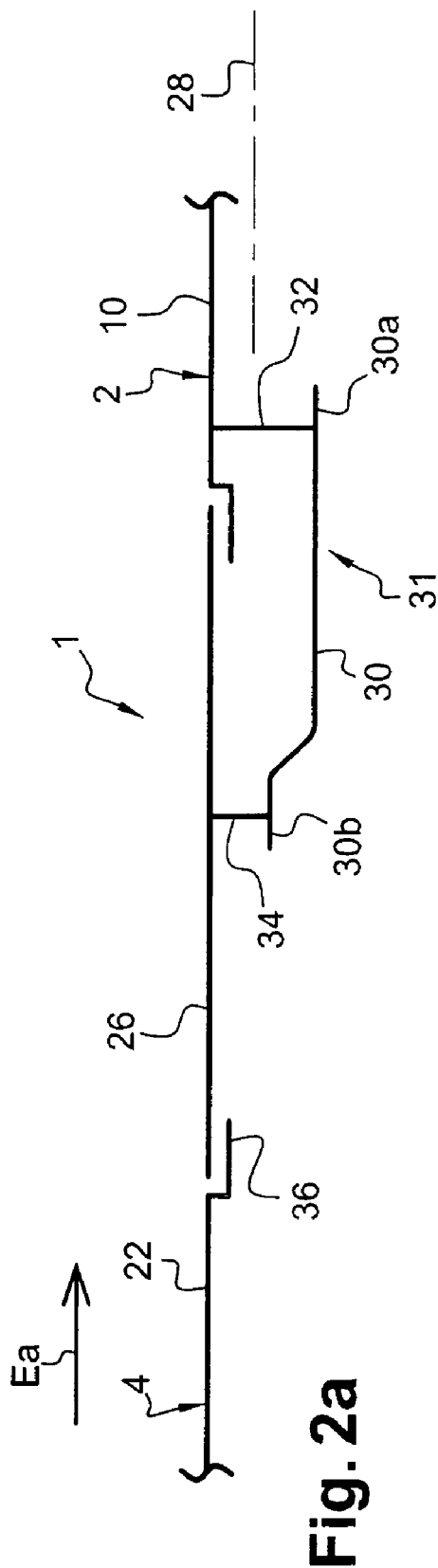
FIG. 2a, already described, shows a diagrammatic principle view of a device for assembly of a shroud according to a conventional embodiment according to prior art when the engine is not subjected to a bending moment generated by the engine thrust.
Figure 2B:
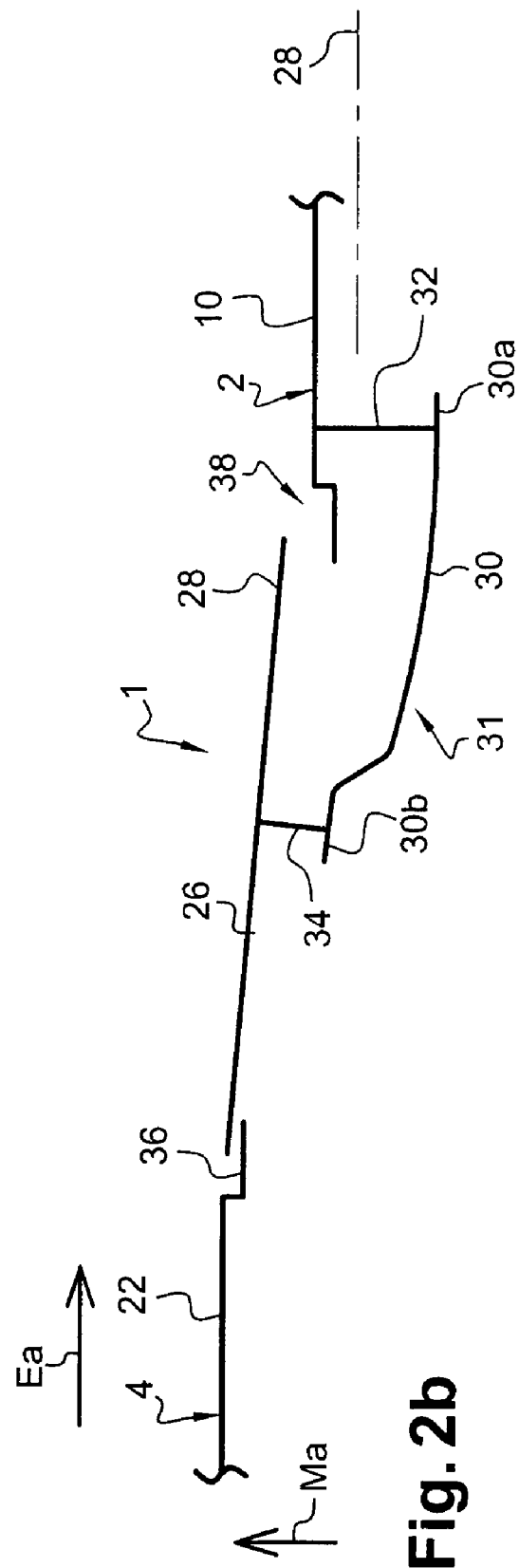
FIG. 2b, already described, shows a diagrammatic principle view similar to that shown in FIG. 2a, when the engine is subjected to the bending moment generated by the engine thrust.

FIG. 3 partially shows the assembly 1 in FIG. 1, with the two approximately identical assembly devices 131, both according to a preferred embodiment of this invention.

As can be seen on this FIG. 3, the two assembly devices 131 are arranged on each side of the longitudinal principal direction 28 of the pylon 2 and cooperate with the shroud 26 that in this case is in the shape of a rectangle with no curved central part, but which has a slight curvature so that it satisfactorily matches the air intake 22. Thus, the shroud 26 may be treated like an annular sector. As indicated above, the curved length L of this annular sector is located in a plane (not shown) approximately orthogonal to the longitudinal principal direction 28 of the pylon 2, and the straight width 12 is approximately parallel to this same longitudinal principal direction 28.

Naturally, the assemblies 1 of the aircraft according to the invention could comprise a larger or smaller number of assembly devices 131, without departing from the scope of the invention. Furthermore, obviously, their locations with respect to the shroud 26 and the pylon 2 may be adapted as a function of the constraints encountered.

FIG. 4a diagrammatically shows one of the assembly devices 131 in FIG. 3, when the engine 4 is not subjected to the bending moment generated by the engine thrust.

This FIG. 4a shows that the device 131 comprises flexible means 130 in the shape of a leaf spring or a coil spring extending approximately parallel to the longitudinal principal direction 28 of the pylon 2. To limit the misalignment between the air intake 22 and the pylon 2, the flexible means 130 are permanently stressed even when this intake 22 is not subjected to the bending moment, which explains their slightly downward curved shape represented on this FIG. 4a.

The flexible means 130 comprise a first end 130a fixed to first connection means 132 themselves fixed to the forward secondary structure 10 of the pylon 2, and a second end 130b fixed to second connection means 134 themselves fixed to the shroud 26.

The special feature of this device 131 for assembly of the shroud 26 lies in the fact that the second connection means 134 are provided with a primary assembly 140 fixed to the shroud 26, and a secondary assembly 142 fixed to the second end 130b of the flexible means 130, and that the primary and secondary assemblies 140 and 142 are connected to each other through a pivot connection 144.

Consequently, as shown in FIG. 4b, when the air intake 22 is controlled by its upwards movement diagrammatically shown by the arrow Ma and caused by the bending moment applied on the engine 4, the shroud 26 is capable of following the air intake due to the deformation of the flexible means 130 of the device 131. Simultaneously, the shroud 26 pivots about the pivot connection 144 and thus maintains permanent contact with the forward secondary structure 10 of the pylon 2.

Obviously, the pivot connection 144 is arranged so as to enable the operation described above, namely to generate a permanent contact between the shroud 26 and the pylon 2. In other words, this pivot connection 144 may be presented as being arranged such that its axis is approximately parallel to an axis along which the bending moment applied to the engine 4 is exerted, or such that its axis is approximately orthogonal to a vertical plane passing through the longitudinal principal direction 28 of the pylon 2, when the aircraft is located on the ground. For guidance, when the pylon 2 is fixed to an upper end of the engine 4, the above mentioned vertical plane will be approximately coincident with a vertical plane diametrically and longitudinally intersecting the engine 4.

With reference to both FIGS. 4a and 4b, it can be seen that the pivot connection 144 is located close to a median portion 146 of the shroud 26, considered along a longitudinal principal direction 28 of the pylon 2. In other words, the pivot connection 144 is arranged below and along the same vertical line as this median portion 146 which, as an illustrative example, could cover half of the straight width 1 (not referenced in this figure) of the annular sector shaped shroud 26. Moreover, still as an illustrative example, it will be possible for the vertical distance D between the median portion 146 and the pivot connection 144 to correspond approximately to a quarter of the straight width 1 of the annular sector shaped shroud 26.

Figure 5:
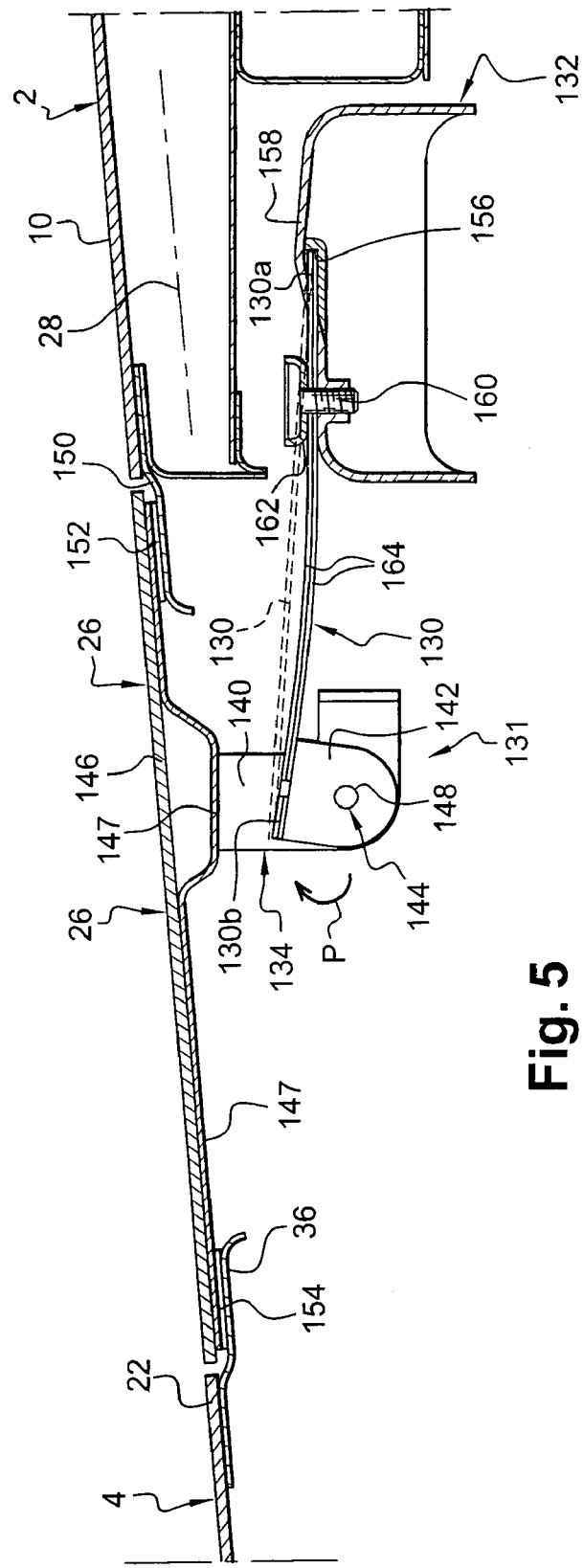
FIG. 5 shows a partial longitudinal sectional view of an assembly device according to FIG. 3 in more detail, when the engine is not subjected to the bending moment generated by the engine thrust.

With reference to FIG. 5 showing the assembly device 131 in more detail, it would be possible for the primary assembly 140 of the second connection means 134 to be composed of a single primary part fixed below the median portion 146 of the shroud 26, on a stiffener 147 fixed to the shroud. Without departing from the scope of the invention, it would also be possible for the single primary part 140 to be directly fixed to the median portion 146 of the shroud 26.

Moreover, the secondary assembly 142 of these second connection means 134 is composed of a single secondary part connected to the primary part 140 using the pivot connection 144, in the form of a pivot axis 148 around which each of these primary and secondary parts 140 and 142 are free to pivot.

Naturally, the pivot axis 148 could be fixed to one of the two primary and secondary parts 140 and 142, the other of these parts 140 and 142 then being capable of rotating around this same axis 148.

Moreover, in the state shown in this FIG. 5 in which the engine 4 is not subjected to the bending moment, the forward part of the shroud 26 is held in contact with the portion 36 of the air intake 22, this portion 36 projecting backwards and being slightly offset downwards to enable perfect aerodynamic continuity between the two elements 22 and 26. Nevertheless, it would also be possible to modify a forward part of the shroud 26 to make it sufficiently slender so that it could rest directly on the outer surface of the air intake 22, without causing any significant aerodynamic drag. In this case, the portion 36 could then be deleted and the assembly could be significantly simplified.

Moreover, the aft part of the shroud 26 is held in contact with a portion 150 of the forward secondary structure 10, this portion 150 projecting forwards and being slightly offset downwards to provide perfect aerodynamic continuity between the two elements 10 and 26.

It is preferable if Teflon bearings 152 and 154 are provided between the aft part of the shroud 26 and the portion 150, and between the forward part of the shroud 26 and portion 36, respectively, so as to reduce wear on portions 36 and 150 and on the forward and aft parts of the shroud 26. Obviously, these two Teflon bearings 152 and 154 are in the form of platelets that may indifferently be rigidly attached to portions 36, 150, or to the shroud 26.

As mentioned above, note that the shroud 26 is held in contact with the engine 4 and the pylon 2 using the return force generated by the flexible means 130 that are stressed even when the engine 4 is not subjected to the bending moment. This is why these bending means 130 are shown curved slightly downwards in FIG. 5.

Nevertheless, to facilitate assembly of the flexible means 130, the second end 130b of these means is rigidly fixed firstly to the second part 142, for example using a simple screw.

The first end 130a of these flexible means 130 is then inserted inside a housing 156 fitted on a base 158 belonging to the first connection means 132, this base 158 being rigidly fixed to a forward end of the forward secondary structure 10 of the pylon 2.

When these operations have been carried out, the flexible means 130 stop inside the housing 156, but are not yet stressed. In this respect, note that this pre-assembly state of the flexible means 130 is shown in dashed lines in FIG. 5, these means 130 then being approximately straight, symbolizing the lack of stress.

The first connection means 132 also comprise means of stressing the flexible means 130, these stressing means for example possibly being in the form of one or several screws 160 installed on the base 158 and being associated with a bearing plate 162. As can be seen clearly in FIG. 5, turning the screws 160 downwards in the base 158 causes a downwards vertical displacement of the bearing plate 162, which then pushes on the flexible means 130 at both ends 130a and 130b respectively fixed in housing 156 and on the secondary part 142 respectively. In this way, when the screws 160 are turned, the secondary part 142 fixed to the second end 130b pivots slightly around the pivot axis 148 in the clockwise direction shown by the arrow P, and therefore the flexible means 130 are gradually curved downwards developing a return force forcing the shroud 26 in contact with portions 36 and 150. Note that once the screws 160 are fully screwed in, the flexible means 130 are held fixed by clamping between the base 158 and the bearing plate 162.

For safety reasons, it is preferable if the flexible means 130 are composed of several flexible strips 164 placed one on top of the other in the direction of the height, and therefore extending approximately parallel to the longitudinal principal direction 28 of the pylon 2.

As an illustrative example and as shown in FIG. 5, the flexible means 130 are composed of two identical and superposed flexible strips 164, these strips 164 preferably being of the leaf spring type.

With reference to both FIGS. 6a and 6b, the figure shows an assembly device 231 for the shroud 26 according to another preferred embodiment of this invention. Obviously, this assembly device 231 can be used to equip assemblies 1 of the aircraft according to the invention, in the same way as the assembly device 131 described above.

In this other preferred embodiment, the second connection means 134 are still fixed to the shroud 26, while the first connection means 132 are no longer attached to the pylon 2, but are fixed to an aft end of the air intake 22 of the engine 4.

When the engine 4 changes from a position in which it is no longer subjected to the bending moment indicated above as shown in 6*a*, to a position in which it is subjected to this bending moment as shown in FIG. 6*b*, the shroud 26 obviously maintains contact with the air intake 22 to which it is attached using flexible means 130, but also remains in contact with the pylon 2.

This is due to the fact that when the air intake 22 is controlled by its upwards movement as shown diagrammatically by arrow Ma, the shroud 26 also follows the same movement, but its aft part pivots downwards around the pivot connection 144 under the effect of the return force of the flexible means 130.

Note that unlike the preferred embodiment described above, the flexible means 130 are more highly stressed when the engine 4 is not subjected to the bending moment than when it is, this special feature assuring permanent contact between the rear part of the faring 26 and the forward secondary structure 10 of the pylon 2. In other words, the upwards movement Ma tends to reduce the return force generated by the flexible means 130, even if it is still enough to force the shroud 26 into contact with the pylon 2, regardless of the relative positions of the pylon and the air intake 22.

The assembly device 231 is advantageous in the sense that it can completely eliminate the risk of scooping, since the aerodynamic flow tends to force the shroud 26 simultaneously into contact with the forward secondary structure 10 of the pylon 2, and into contact with the aft end of the air intake 22.

Thus once again, the shroud 26 behaves approximately as if there were a simple pivot connection between the rear part of this shroud 26 and the forward secondary structure 10 of the pylon 2.

Obviously, those skilled in the art could make several modifications to the aircraft and to the devices 131 and 231 for assembly of the shroud 26 that have just been described solely as non-limitative examples.

The invention claimed is:

1. Device for assembly of a shroud arranged between firstly an air intake of an aircraft engine and secondly a pylon fixed to the said engine and to a structure element of this aircraft, the said device comprising:

stressed flexible means provided with a first end and a second end, said flexible means being designed to force the shroud into contact with the air intake and the engine pylon;

first connection means connected firstly to one of the elements among the group composed of the pylon and the air intake, and secondly to the first end of the flexible means, these first connection means being designed such that the first end of the flexible means is fixed to said one of the elements among the group composed of the pylon and the air intake; and second connection means connected firstly to the shroud and secondly to the second end of the flexible means, characterized in that the second connection means comprise a primary assembly fixed to the shroud and a secondary assembly fixed to the second end of the flexible means, and in that the primary and secondary assemblies are connected to each other through a pivot connection.

2. Device for assembly of a shroud according to claim 1, characterized in that the first connection means are connected to said pylon.

3. Device for assembly of a shroud according to claim 2, characterized in that the pivot connection is close to a median portion of the shroud, considered along a longitudinal principal direction of said pylon.

4. Device for assembly of a shroud according to claim 3, characterized in that the primary assembly of the second connection means is composed of a single primary part fixed to the said median portion of the shroud considered along the longitudinal principal direction of the said pylon, and in that the secondary assembly of these second connection means is composed of a single secondary part connected to the primary part through said pivot connection.

5. Device for assembly of a shroud according to claim 4, characterized in that the pivot connection is made through a pivot axis about which each of the primary and secondary parts can pivot.

6. Device for assembly of a shroud according to claim 2, characterized in that the first connection means comprise a base that keeps the first end of the flexible means fixed, the said base being fixed to a forward end of said pylon.

7. Device for assembly of a shroud according to claim 6, characterized in that the first connection means also include means of applying stress to flexible means, these means of applying stress cooperating with said base.

8. Device for assembly of a shroud according to claim 1, characterized in that the first connection means are connected to said engine air intake.

9. Device for assembly of a shroud according to claim 1, characterized in that the flexible means are composed of a flexible strip extending approximately parallel to a longitudinal principal direction of said pylon.

10. Device for assembly of a shroud according to claim 1, characterized in that the flexible means are composed of several superposed flexible strips extending approximately parallel to a principal longitudinal direction of said pylon.

11. Aircraft comprising at least one engine with an air intake, each engine being fixed to a pylon itself fixed to a structure element of this aircraft, a shroud being installed between the air intake of the said engine and said pylon, characterized in that the shroud for each engine, is installed between the air intake of said engine and said pylon through at least one assembly device according to any one of the above claims.

* * * * *